(12) United States Patent
Gammel

(10) Patent No.: US 9,927,779 B2
(45) Date of Patent: Mar. 27, 2018

(54) POWER SOURCING EQUIPMENT AND METHOD OF DETECTING INRUSH FAULT ERRORS

(71) Applicant: John C. Gammel, Austin, TX (US)

(72) Inventor: John C. Gammel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1416 days.

(21) Appl. No.: 13/681,040

(22) Filed: Nov. 19, 2012

(65) Prior Publication Data

US 2014/0142765 A1    May 22, 2014

(51) Int. Cl.
*G05B 13/02* (2006.01)
*H04L 12/64* (2006.01)
*H04L 12/10* (2006.01)

(52) U.S. Cl.
CPC .............. *G05B 13/02* (2013.01); *H04L 12/10* (2013.01); *H04L 12/6418* (2013.01)

(58) Field of Classification Search
CPC ..... G06F 1/00; G06F 1/04; G06F 1/12; G06F 1/26; G06F 1/32; G06F 11/30
See application file for complete search history.

(56) References Cited

U.S. PATENT DOCUMENTS

| 6,473,608 | B1 * | 10/2002 | Lehr | G05F 1/66 370/402 |
|---|---|---|---|---|
| 7,355,416 | B1 * | 4/2008 | Darshan | 324/713 |
| 7,406,614 | B2 | 7/2008 | Peleg et al. | |
| 7,441,133 | B2 | 10/2008 | Giat et al. | |
| 2007/0011547 | A1 * | 1/2007 | Karam | 714/746 |
| 2008/0062586 | A1 * | 3/2008 | Apfel | 361/18 |
| 2009/0243565 | A1 * | 10/2009 | Darshan | H04L 12/10 323/234 |
| 2010/0007334 | A1 * | 1/2010 | Apfel | 324/123 R |
| 2010/0095136 | A1 * | 4/2010 | Karam | H04L 12/10 713/300 |
| 2010/0265080 | A1 * | 10/2010 | Henson | G08B 25/04 340/657 |
| 2011/0026525 | A1 | 2/2011 | He | |
| 2011/0066872 | A1 * | 3/2011 | Miller et al. | 713/340 |
| 2012/0011380 | A1 * | 1/2012 | Dove | H04L 12/10 713/300 |
| 2012/0075544 | A1 * | 3/2012 | Sasaki | G02F 1/133603 349/42 |
| 2012/0293017 | A1 * | 11/2012 | Lidsky | H02H 3/087 307/126 |
| 2014/0111180 | A1 * | 4/2014 | Vladan | H04L 12/413 323/312 |
| 2014/0136874 | A1 * | 5/2014 | Diab | H04L 12/40045 713/340 |
| 2014/0372773 | A1 * | 12/2014 | Heath | H04L 12/10 713/300 |

* cited by examiner

*Primary Examiner* — Thomas Lee
*Assistant Examiner* — Mohammad A Rahman
(74) *Attorney, Agent, or Firm* — Cesari & Reed LLP; R. Michael Reed

(57) ABSTRACT

A method includes monitoring total energy supplied, during a power-on phase, to a power field effect transistor (FET) coupled to a network port of a power sourcing equipment (PSE) device using a controller. The method further includes detecting an error when the total energy exceeds a predetermined threshold.

20 Claims, 3 Drawing Sheets

POWER SOURCING EQUIPMENT AND METHOD OF DETECTING INRUSH FAULT ERRORS

FIELD

The present disclosure is generally related to power sourcing equipment devices, and more particularly, to a power sourcing equipment devices configured to detect a power fault.

BACKGROUND

Power over Ethernet (POE) devices include power sourcing equipment (PSE) devices that deliver power and data through Ethernet cabling to one or more powered devices (PDs). PSE devices may be endpoint or mid-span devices, and the PDs at the other end of the Ethernet cabling include electronic devices, such as security cameras and other electronic devices, that receive operating power and data through the Ethernet cabling.

The Institute of Electrical and Electronics Engineers (IEEE) defined a POE Standard for delivering power to a PD on the same cable that is carrying data. The POE Standard may be found in IEEE 802.3 clause 33 as amended by IEEE Std 802.3 at-2009. The PSE provides power through the Ethernet cabling either in a common-mode on one of the data pairs (for 10/100/1000BASE-T) or on the spare wire pairs of the Ethernet cable for 10/100BASE-T applications. The POE Standard defines a PD Detection phase, an optional PD classification phase, a power-up phase, and an operating phase. During the detection phase, the PSE probes with limited current and voltage (in the range of 2.8V to 10V) to determine if the PD presents a signature resistance of approximately 25 kΩAccording to the POE Standard, a valid PD must present a resistance of between 23.75 kΩ and 26.25 kΩ.

After a valid PD signature resistance is detected, the PSE device may optionally perform a PD classification operation. In the PD classification phase, the PSE applies a voltage of between 15.5V and 20.5V to the network port and measures the current drawn by the PD coupled to the port through the Ethernet cable. The measured current determines the maximum power level that can be drawn by the PD during device operation, allowing the PSE to manage its power budget. If the PD classification operation is not performed, the default power level for the PSE may be set at 15.4 Watts.

After successful PD classification, assuming that the PSE has enough available power to satisfy the PD's needs, the PSE device enters a power-up phase. During the power-up phase, the PSE device applies power to the network port as long as the PSE device does not detect an overcurrent fault, a disconnection of the PD, or an input under-voltage or overvoltage fault. The POE+Standard specifies that, during the power-up phase, the PSE limits the current to a level that is between 400 mA and 450 mA for between 50 ms and 75 ms when the port voltage is more than 30V (IEEE 802.3 at 33.2.7.5).

Conventionally, PSE devices include a power field effect transistor (FET) that can be controlled to limit the current to the port. In an example, the port voltage (i.e., the voltage supplied to the network port) is the power supply voltage minus the voltage across the power FET. For some PSEs, the power supply voltage may be in a range of 50V to 57V, so when the port voltage is 30V, the voltage across the power FET is approximately 20V to 27V. Since the current can be reduced when the port voltage is less than 30V the worst case FET stress occurs at the point where the current is reduced which must be more than 20-27V and is typically 30V. Using typical numbers for a 30V power FET voltage with a 425 mA current for 60 ms, the power FET may see 12.75 Watts for 60 ms (approximately 0.765 Joules), which can produce significant heat. This amount of heat can be a determining factor in the selection of the power FET and the circuit layout, impacting both the cost and circuit density of the PSE circuitry.

SUMMARY

In an embodiment, a method includes monitoring total energy supplied to a power field effect transistor (FET) coupled to a network port of a power sourcing equipment (PSE) device during a power-on phase. The method further includes detecting an error when the total energy exceeds a pre-determined threshold.

In another embodiment, a power sourcing equipment (PSE) device includes a network port configurable to couple to a network cable. The PSE device further includes a power field effect transistor (FET) including a first terminal coupled to the network port, a control terminal, and a second terminal coupled to a power supply node. Further, the PSE device includes control circuitry coupled to the control terminal and configured to measure a total energy dissipated in the power FET during a power-on phase and to detect an error when the total energy exceeds a threshold.

In still another embodiment, a circuit for use within a power sourcing equipment (PSE) device includes a terminal configured to couple to a control terminal of a power field effect transistor (FET) coupled to a network port of the PSE device. The circuit further includes a control circuit coupled to the first terminal and configured to detect an error when a total energy provided to the power FET exceeds a threshold during a power on phase.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

The POE Standard specifies an in-rush current limit for the PD and requires a minimum load capacitor having a capacitance of at least 5μF. At turn on, a compliant PD will limit the inrush current to a level that is below a threshold to allow the load capacitor to charge to a supply voltage level in a controlled manner. By keeping the PD current limit below a level of a PSE current limit, the PD's power up characteristics can be controlled independently from the behavior of the PSE, ensuring interoperability regardless of PSE output characteristics.

Embodiments of a PSE device and methods are described below that provides an energy limit during a turn on phase that can be used to protect a power FET. In particular, the POE Standard (IEEE 802.3 at 33.3.7.3) specifies that the PD cannot have more than 180μF of input capacitance unless it limits the current during an in-rush phase. If the PD limits the current, the stress on the power FET of the PSE is removed. However, assuming a worst case input capacitance of 180 μF, the energy required to charge the input capacitance is 0.5 $CV^2$ (i.e., $0.5*180\mu F*(57V)^2$), so for a worst case supply voltage of 57V, less than approximately 0.292410 Joules should be dissipated in the power FET for a PD that complies with the POE Standard. This amount of energy is significantly less than the typical case power of 0.765 Joules for a power FET voltage of 30V with a current of 425 mA for 60 ms previously calculated.

As will be discussed in detail below, embodiments described below may include a controller configured to monitor the total energy dissipated in the FET and to detect an error when the total energy exceeds a threshold level. In an embodiment, during the power-on phase, a controller of the PSE can monitor the FET power level and detect an error (such as a power-on or inrush fault that may cause a controller to turn off the power FET) when the total energy dissipated in the FET exceeds the threshold. In an example, the power threshold may be configured to be approximately 0.3 Joules, which corresponds to a threshold that is slightly higher than the 0.292410 Joules described above. If the power limit of 0.3 Joules is exceeded, the PSE may determine that the PD represents a non-compliant load, and the PSE may turn off power to the network port.

In another embodiment, during the turn on phase, PSE device may monitor the port voltage of the network port over time and determine if the port voltage is moving (changing over time). If PSE device is providing 425 mA of current to the network port and the input capacitance of the PD is 180 μF, the port voltage should be increasing at a rate of approximately 2.36V per millisecond. If the port voltage does not change over time, the PSE may detect an error and may generate a signal indicating a power-on fault. One possible example of a PSE device configured to detect during the power-up phase is described below with respect to FIG. 1.

Figure 1:
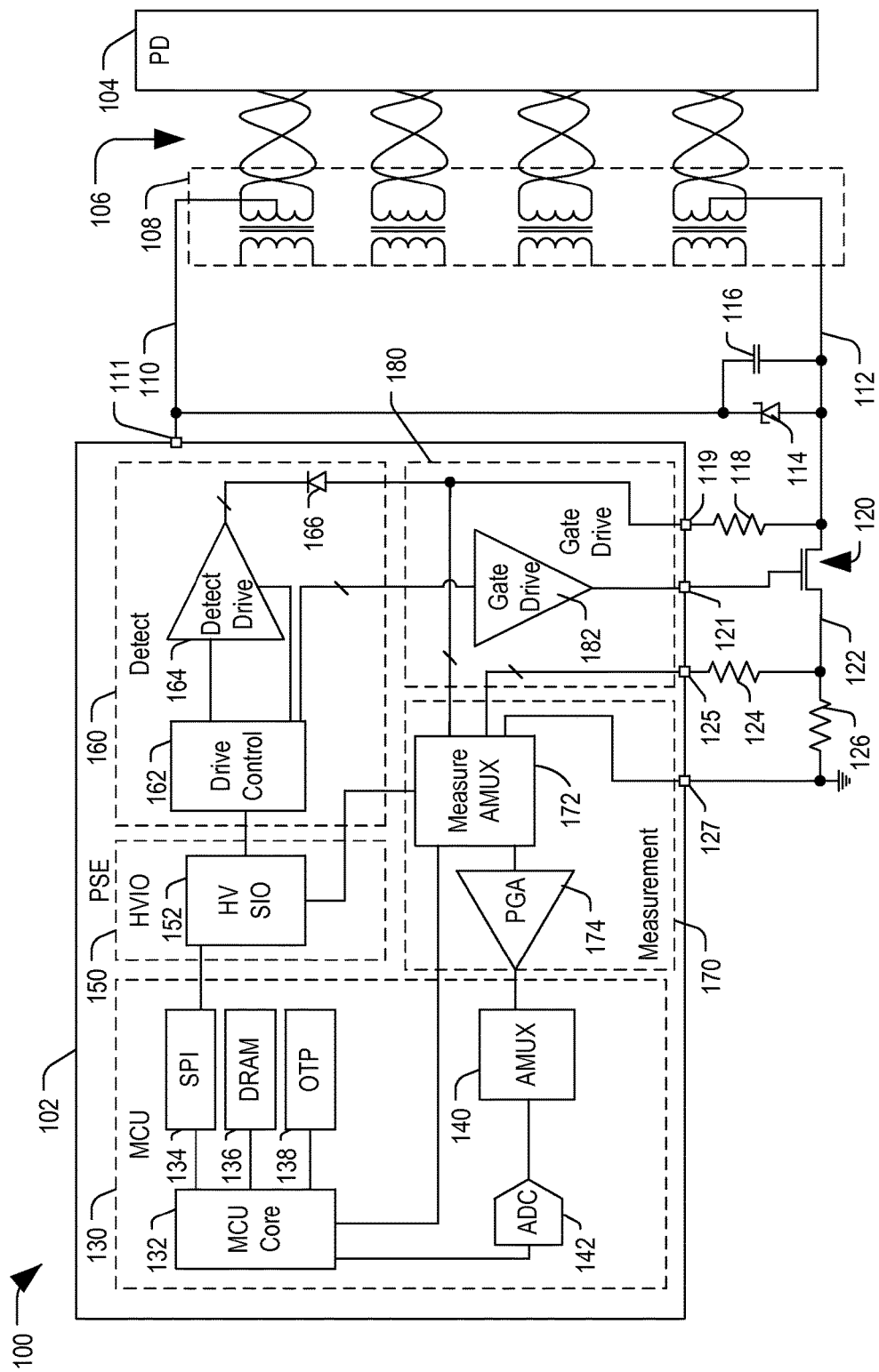
FIG. 1 is a diagram of a system including a PSE device configured to provide an integrated power limit

FIG. 1 is a diagram of a system 100 including a PSE device 102 configured to provide an integrated power limit. PSE device 102 may be coupled to a PD 104 via a network cable 106, such as a twisted pair Ethernet cable, which can carry power and data from PSE device 102 to PD 104. PSE device 102 may include a pad or pin 111 that may be coupled to an output terminal 110 that can couple PSE device 102 to a network port 108, such as an RJ-45 network port, which can be coupled to network cable 106. Port 108 may include one or more transformers configured to couple to wire pairs of network cable 106 to provide power to PD 104.

System 100 further includes a node 112 coupled to network port 108 and configured to form a portion of a return current flow path from PD 104 to PSE device 102. System 102 may include a breakdown diode 114 (such as a zener diode) that may include an anode coupled to node 112 and a cathode coupled to node 110. System 102 may further include a capacitor 116 including a terminal that can be coupled to node 112 and a terminal that can be coupled to the cathode of breakdown diode 114.

System 100 may further include a resistor 118 having a first terminal that can be coupled to node 112 and a second terminal that can be coupled to a pad or pin 119 of PSE device 102. System 100 may also include a power FET 120 having a first terminal that can be coupled to node 112, a control terminal that can be coupled to a pad or pin 121 of PSE device 102, and a second terminal that can be coupled to a node 122. System 100 may also include a resistor 124 having a first terminal that can be coupled to node 122 and a second terminal that can be coupled to a pad or pin 125 of PSE device 102. System 100 may further include a resistor 126 having a first terminal that can be coupled to node 122 and a second terminal coupled to a supply terminal (such as ground), which is also coupled to a pad or pin 127 of PSE device 102.

PSE device 102 may include a micro control unit (MCU) 130 that may be coupled to a high voltage input/output (HVIO) circuit 150 and to a measurement circuit 170. PSE device 102 may further include a detect circuit 160 that may be coupled to HVIO circuit 150 and to gate drive circuit 180.

MCU 130 includes an MCU core 132 including a terminal that may be coupled to a measurement current multiplexer (AMUX) 172 of measurement circuit 170. MCU 130 may further include a serial peripheral interface (SPI) 134 coupled to MCU core 132 and to a high voltage serial input/output (HV SIO) circuit 152 of HVIO 150. MCU 130 may also include a dynamic random access memory (DRAM) 136 and a one-time programmable memory 138 that may be coupled to MCU core 132. MCU 130 may further include a current multiplexer (AMUX) 140 that includes an input, which may be coupled to an output of a programmable gain amplifier (PGA) 174 of measurement circuit 170. AMUX 140 also includes an output that may be coupled to an input of an analog-to-digital converter (ADC), which has an output that may be coupled to MCU core 132.

HVIO 150 may include HV SIO circuit 152, which may provide a high voltage serial interface between MCU 130 and detect circuit 160 and measurement circuit 170. HV SIO circuit 152 includes a first terminal coupled to a terminal of SPI 134, a second terminal coupled to a terminal of a drive control circuit 162 of detect circuit 160, and a third terminal coupled to a terminal of measurement AMUX 172 of measurement circuit 170.

Detect circuit 160 includes drive control circuit 162, which has a terminal coupled to the second terminal of HV SIO 152, a second terminal coupled to a detect drive circuit 164, a third terminal coupled to a control terminal of detect drive circuit 164, and a fourth terminal coupled to a gate drive circuit 182. Detect drive circuit 164 includes an output coupled to a cathode of a diode 166. Diode 166 includes an anode that may be coupled to resistor 118 through pad or pin 119.

Gate drive circuit 180 includes a gate driver 182 including an input that may be coupled to drive control circuit 162 and including an output that may be coupled to a control terminal of transistor 120 through pad or pin 121. Gate driver 182 controls transistor 120 to couple nodes 112 and 122 to couple a return current flow path from PD 104 to the supply terminal (such as ground).

Measurement circuit 170 includes measure AMUX 172 including a first input that may be coupled to pin or pad 119, a second input that may be coupled to pin or pad 125, and a third input that may be coupled to pin or pad 127. Measure AMUX 172 further includes a terminal that may be coupled to a terminal of HV SIO 152. Measure AMUX also includes a terminal that may be coupled to a terminal of MCU core 132 and a terminal that may be coupled to a terminal of AMUX 140.

In an embodiment, during a turn on (power-on) phase, MCU core 132 may communicate with drive control 162 through SPI 134 and HV SIO 152. Drive control 162 may control gate drive 182 to control power FET 120 and to control detect drive 164. Measure MUX 172 can be used by MCU core 132 to monitor a voltage across power FET 120 based on voltages at pads or pins 119 and 125 and can be used to monitor a current through pad or pin 127. MCU core 132 may be configured to determine the total energy applied to the power FET 120 over a period of time. In an example, MCU core 132 may utilize measure AMUX 172 to periodically measure the current flowing through and the voltage across power FET 120 during the turn on phase and may determine a total energy dissipated in the power FET 120. When the total energy exceeds an energy threshold (which may be a value stored in memory, such as OTP 138, DRAM 136, or other memory (not shown)), MCU core 132 may control drive control circuit 162 to turn off power FET 120. In an example, the energy threshold may be programmable and can be set to approximately 0.3 Joules. When the total energy exceeds 0.3 Joules, MCU 132 may control drive control 162 to turn off power FET 120, protecting power FET 120 from overheating.

In another embodiment, during the turn on phase, MCU core 132 may utilize measure AMUX 172 to monitor the port voltage between nodes 110 and 112 to determine if the port voltage is changing. If the voltage potential between nodes 110 and 112 remains substantially constant over a period of time, MCU core 132 may detect an error. In a particular embodiment, MCU core 132 may determine that PD 104 does not comply with the POE Standard and may generate a start-up fault signal. In some embodiments, MCU core 132 controls drive control 162 to turn off power FET 120 in response to determining that the port voltage is not changing. In an example, assuming a port current of approximately 425 mA and an input capacitance of the PD of approximately 180 µF, the port voltage may increase at a rate of approximately 2.36V per millisecond representing charging of the input capacitance of PD 104. If the port voltage does not change, the non-changing port voltage may be indicative of a PD that does not comply with an expected standard, such as a POE Standard. The error may cause MCU core 132 to detect start-up fault condition and to generate a signal indicating a start-up fault. However, in some embodiments, detection of a start-up fault based on the non-changing port voltage may be complicated in that, during the initial charging of the input capacitance of PD 104, the port voltage between nodes 110 and 112 may be fairly constant while an input switch of PD 104 turns on. Accordingly, an embodiment that detects the error condition based on a rate-of-change of the port voltage may be configured to delay sampling to allow the switch of the PD 104 to be turned on, for example.

In one possible embodiment, PSE device 102 may be implemented by an integrated circuit. In another embodiment, power FET 120, resistors 118, 124, 126, diode 114, and/or capacitor 116 may incorporated in the PSE device 102. Further, while the illustrated embodiment depicts an MCU core 132, in an alternative embodiment, a controller may be used that incorporates the functionality of MCU core 132 as well as drive control and/or gate drive functionality.

In the above discussion, some of the phases during the detection, classification, and turn on portions of the PSE device 102 were mentioned. One possible example of the port voltage over time during detection, classification, and turn on phases is described below with respect to FIG. 2.

Figure 2:
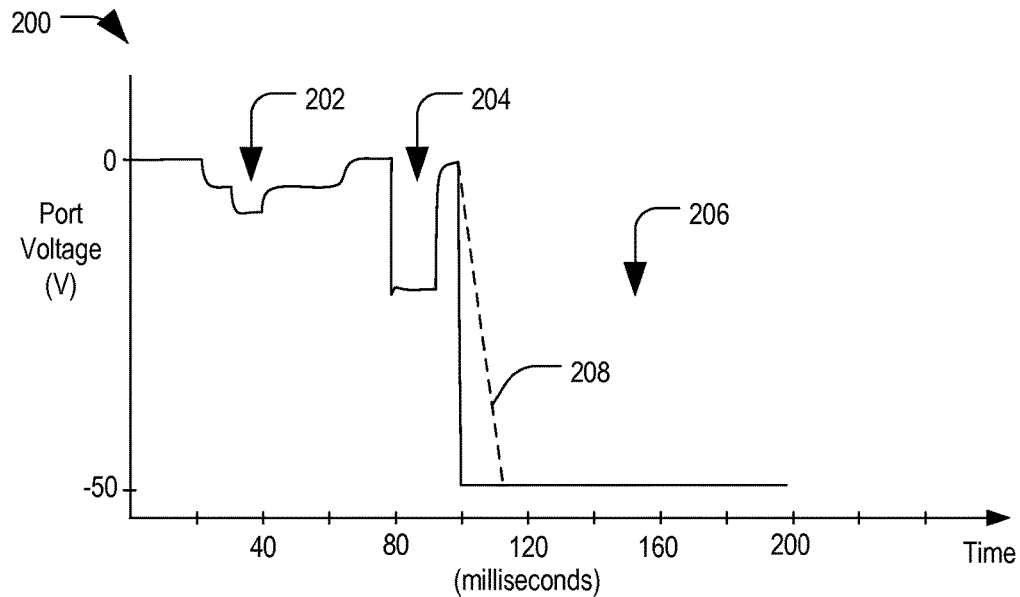
FIG. 2 is a graph of port voltage versus time at a network port of a representative example of a PSE device during detection, classification, and power-on phases, where the port voltage can ramp up slowly during the turn on phase.

FIG. 2 is a graph 200 of port voltage versus time at a network port of a representative example of a PSE device during detection, classification, and power-on phases. In this example, the port voltage is referenced to a 50V supply voltage to provide a port voltage that ranges from zero volts to approximately negative 50V. At 202, a PD detection phase is shown during which PSE device 102 may apply a voltage (as a negative voltage) between approximately 2.8 and 10 Volts to network port 118 and may monitor a current drawn by PD 104 to detect the presence of a resistance in a range of between 23.75 kΩ and 26.25 kΩ a indicating the presence of a PD 104. If no resistance is detected or if the resistance does not match the expected resistance, controller should not provide power.

Assuming that a PD 104 is coupled to network port 108 and that it provides the expected signature resistance, PSE device 102 may then apply a classification voltage (generally indicted at 204) to the network port 118 during a classification phase. In an embodiment, the classification voltage may be in a range of 15.5 volts and 20.5 volts. As previously described, the classification phase 204 is used to determine the power requirements of the PD 104. Depending on the current drawn by PD 104 in response to the classification voltage, PSE device 102 determines a power requirement of PD 104. In the illustrated example, the classification phase 204 corresponds to a POE classification phase according to the POE Standard, as opposed to a classification under the POE+ Standard, which would utilize two classification mark signals to determine the power capability of the PD 104.

After PD 104 is detected (detection phase) and the power requirements are determined (classification phase), PSE device 102 supplies power to network port 118 during a power-on or startup phase 206. During the power-on or startup phase 206, PSE device 102 supplies a voltage potential of approximately 50 volts to the network port 118 includes the determined voltage level and a current limited current that is between 400 mA and 450 mA, which provides a controlled current for charging the input capacitance of PD 104. In the illustrated example, PSE device 102 supplies negative 50V to PD 104 during the power-on phase 206. During the power-on phase 206, the port voltage is expected to change over time (as illustrated by dashed line 208) as the charge stored by the input capacitance of PD 104 changes. In an example, a rate of change of the port voltage over a period of time defines a slope that is less than a predefined slope (a pre-defined or pre-determined rate of change) corresponding to the expected rate of change of the port voltage. In a particular embodiment, the pre-determined rate of change is approximately 2.36V per millisecond.

As previously described, MCU core 132 may monitor the voltage and current across power FET 120 during power-on phase 206 and detect an error (such as a start or power-on fault) when the total energy dissipated in power FET 120 exceeds a threshold. Alternatively, MCU core 132 may monitor the port voltage during power-on phase 206 and detects an error when the port voltage does not change over a period of time or does change but at a rate that differs from an expected rate of change. In either embodiment, in response to detecting the error, MCU 132 may control drive control circuit 162 to turn off power FET 120.

In an embodiment, MCU 132 cooperates with other circuit components to implement a controller configured to control operation of gate drive circuitry 180, detect circuitry 160, measurement circuitry 170, and optionally external components, such as power FET 120. In another embodiment, the controller may be implemented using analog-to-digital converters configured to convert sampled currents and voltages into digital values, integrators to integrate the digital values over time, and logic circuitry configured to determine when the total energy supplied to power FET 120 exceeds a threshold. In another embodiment, the controller be implemented using a processor and memory configured to store threshold values to detect an error. One possible example of a controller implemented using a processor and a memory is described below with respect to FIG. 3.

Figure 3:
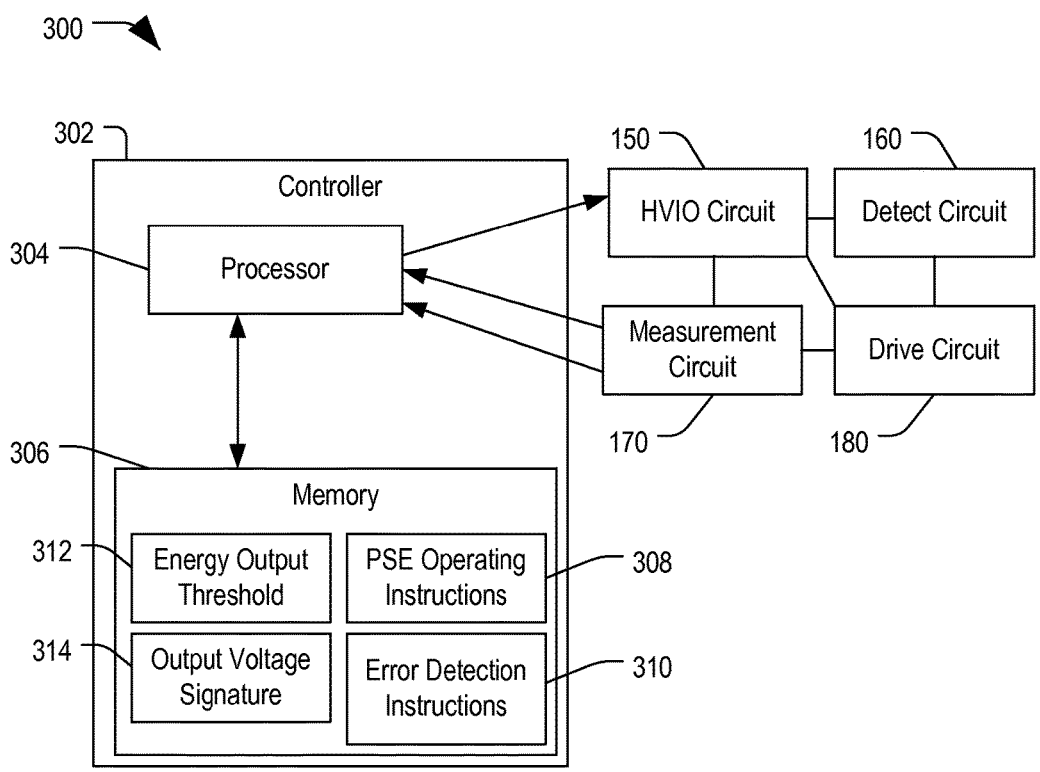
FIG. 3 is a block diagram of a portion of a PSE device including a controller configured to provide an integrated power limit.

FIG. 3 is a block diagram of a portion 300 of a PSE device, such as PSE device 102 in FIG. 1, including a controller 302 configured to provide an integrated power limit. In the illustrated embodiment, controller 302 may include an output coupled to HVIO circuit 150. HVIO circuit 150 may be coupled to detect circuit 160, measurement circuit 170 and drive circuit 180. Controller 302 may be configured to control detection and classification operations and to control power FET 120 (for example) through HVIO circuit 150.

In the illustrated embodiment, controller 302 includes a processor 304 coupled to HVIO circuit 150 and measurement circuit 170. In some embodiments, controller 302 may include an ADC circuit (such as ADC 142). Controller 302 may also include a memory 306 coupled to processor 304 and configured to store instructions that, when executed, cause processor 304 to detect an error during a power on phase.

Memory 306 may store instructions executable by processor 304, such as PSE operating instructions 308 that, when executed, cause processor 304 to control detect circuit 160 (depicted in FIG. 1) and gate drive circuit 180 to perform PD detection and classification operations. Memory 306 may further include error detection instructions 310 that, when executed, cause processor 304, during a power-on phase, to monitor the at least one of the current and the voltage across power FET 120 or the port voltage, depending on the implementation. Further, memory 304 may include an energy output threshold 312 and/or an output voltage signature 314, which can be used in conjunction with error detection instructions 308 to detect an error, such as a start fault, based on either the total energy dissipated in the power FET 120 or the rate of change of the port voltage provided to network port 108.

In an embodiment, PSE device 102 may communicate data and/or instructions to and from another device through an input/output (I/O) interface (not shown). In an example, the other device may provide updated instructions for PSE operation and/or error detection, which can be used to upgrade or replace PSE operating instructions 308 and/or error detection instructions 310. In another example, the other device may be used to set the energy dissipation threshold 312 and/or to configure the output voltage signature 314. In an example, the output voltage signature 314 may be defined by a worst case or expected value of an input capacitance of PD 104. For example, if the port current is 425 mA and the input capacitance is assumed to be 180 μF, the port voltage may change at a rate of about 2.36V per millisecond, so the output voltage signature 314 may be configured to represent an expected change in the port voltage over time. In this example, controller 302 may detect an error when the rate of change of the port voltage differs from the output voltage signature 314. In one example, the controller 302 detects the error when the rate of change of the port voltage differs from the output voltage signature 314 by more than a pre-determined amount.

In one example, HVIO circuit 150 may be incorporated within detect circuit 160 and/or within drive circuit 180. Further, while memory 306 is depicted as being part of controller 302, in some example, memory 306 may be external to controller 302.

The portion 300 of PSE device 102 can be configured to determine an error when the total energy provided to network port 108 during a power on phase exceeds the energy output threshold 312 or when a rate of change of the port voltage differs from the output voltage signature 314. One possible example of a method of determining an error based on the total energy consumed by the power FET is described below with respect to FIG. 4.

Figure 4:
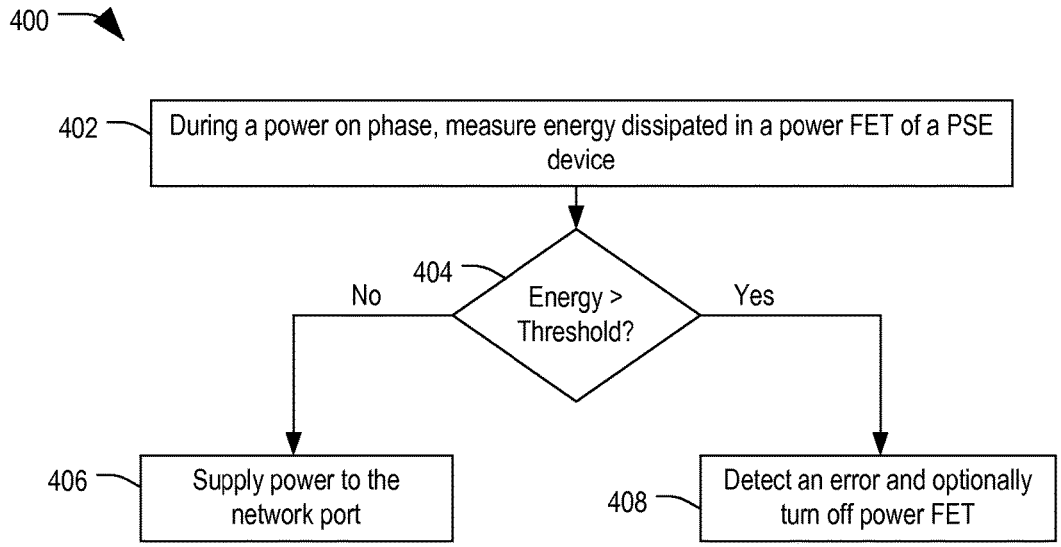
FIG. 4 is a flow diagram of an embodiment of a method of providing an integrated power limit based on energy dissipation in a power FET during the power-on phase.

FIG. 4 is a flow diagram of an embodiment of a method 400 of providing an integrated power limit based on energy supplied to the network port during the power-on phase. At 402, during a power-on phase, PSE device 102 may measure energy dissipated in a power FET 120. In an example, PSE device 102 may monitor a current flowing through the power FET 120 and a voltage across power FET 120 and may determine a total energy dissipated based on the current and voltage measurements. Advancing to 404, if the energy does not exceed a threshold, the method 400 proceeds to 406 and PSE device 102 may control power FET 120 to continue to supply power to network port 108. Otherwise, if the energy exceeds the threshold at 404, the method 400 continues to 408 and PSE device 102 may detect an error and optionally turn off power FET 120. In an embodiment, PSE device 102 may turn off current flow through power FET 120 in response to detecting the error.

While the above example describes one possible method of providing an integrated power limit using a PSE device 102, it is also possible to provide the integrated power limit by monitoring the port voltage. One possible example of detecting an error based on the port voltage is that changes too slowly over time, is described below with respect to FIG. 5.

Figure 5:
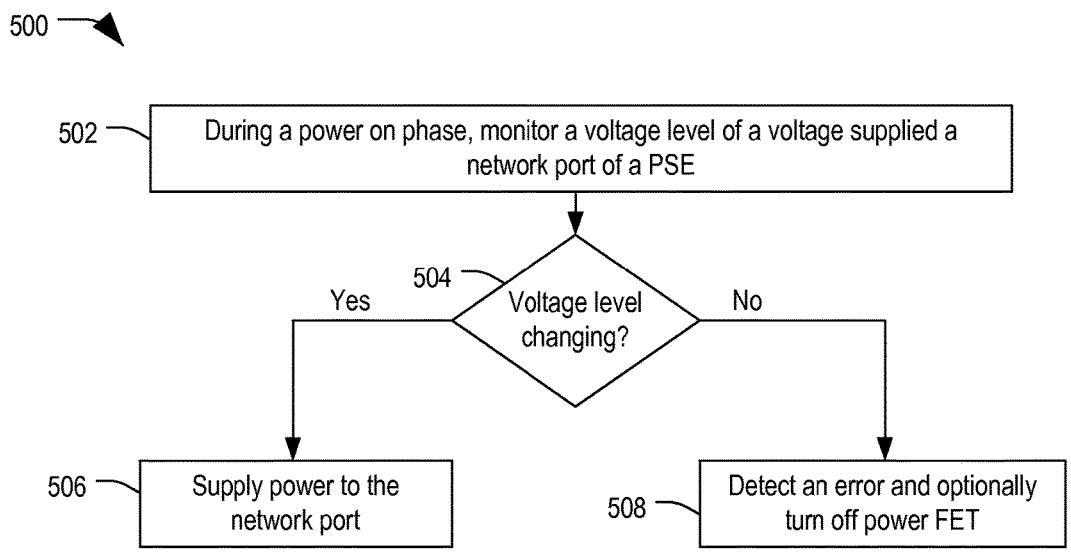
FIG. 5 is a flow diagram of an embodiment of a method of providing an integrated power limit based on a rate of change of a port voltage over time.

FIG. 5 is flow diagram of an embodiment of a method 500 of providing an integrated power limit based on a rate of change of a port voltage over time. At 502, during a power-on phase, PSE device 102 may monitor a voltage level of a voltage supplied to a network port. Advancing to 504, if the voltage level is changing, the method 500 advances to 506 and PSE device 102 may supply power to the network port 108. Otherwise, if the voltage level is not changing or is changing too slowly at 504, the method 500 continues to 508 and PSE 102 may detect an error and optionally turn off power FET 120. In an embodiment, PSE 102 compares the rate of change of the voltage level to a pre-determined rate of change. In one example, the difference between the rates of change is determined and then the difference may be compared to a threshold to determine if there is an error. In this example, slight differences or differences that are less than a threshold difference may be ignored while larger differences may be used to detect the error. In one possible embodiment, the error may be a start fault or a power-on fault.

While the methods of FIGS. 4 and 5 provide different methods for detecting an error (such as a start fault) associated with the network port, they may be used in combination such that PSE 102 can detect a start fault if either or both of the conditions are met. In an example, PSE 102 detects a start fault when the total energy dissipated in power FET 120 exceeds a threshold and/or when the voltage provided to network port 108 has a rate of change that differs from an output voltage signature. In both cases, PSE 102 may detect a start fault or power-on fault. However, in some instances, a particular source of non-compliance by the PD may trigger detection using the total energy supplied while the port voltage may vary as expected (or the port voltage may remain unchanging while the total energy is still less than the threshold).

In conjunction with the systems, circuits, and methods described above with respect to FIGS. 1-5, a PSE device may include a controller configured to detect an error (such as a power-on fault) based on at least one of a total energy dissipated in a power FET coupled to a network port and a port voltage provided to the network port. In one example, the PSE device integrates the total energy dissipated in the power FET and detects the error when the total energy exceeds a pre-determined threshold. In another example, the controller monitors the port voltage and detects an error when the port voltage has a rate of change that differs from an output voltage signature. In response to detecting the error, the PSE device may turn off the power FET. In some embodiments, by total energy dissipation and port voltage may be used to detect an error.

Although the present invention has been described with reference to preferred embodiments, workers skilled in the art will recognize that changes may be made in form and detail without departing from the scope of the invention.

What is claimed is:

1. A method comprising:
   after successfully detecting a powered device (PD) coupled to a network port of a power sourcing equipment (PSE) device, controlling, using a microcontroller circuit, a drive control circuit to apply power to the network port;
   during a power-on phase during which the power is applied, monitoring, using the microcontroller circuit, total energy dissipated in a power field effect transistor (FET) of the PSE device that is configured to supply power and data to the PD, the power FET coupled to the network port of the PSE device; and
   automatically detecting an error, using the microcontroller circuit, when the total energy exceeds a pre-determined threshold.

2. The method of claim 1, further comprising turning off the power FET in response to detecting the error.

3. The method of claim 1, wherein monitoring the total energy supplied to the power FET comprises:
   periodically measuring a power FET voltage and a power FET current during the power-on phase to determine periodic measurements; and
   determining the total energy based on the periodic measurements.

4. The method of claim 1, wherein the pre-determined threshold comprises to at least one of a current limit, a voltage limit, timing of the turn on phase, and an input capacitance limit for a powered device specified by an industry standard.

5. The method of claim 1, wherein the pre-determined threshold is approximately 0.3 Joules.

6. The method of claim 1, further comprising:
   monitoring a voltage level of a supply voltage provided to the network port during the power-on phase; and
   determining a difference between a rate of change in the voltage level over a period of time and a predefined rate of change.

7. The method of claim 6, wherein detecting the error comprises:
   comparing the difference to a threshold; and
   determining the error when the difference is less than the threshold.

8. A power sourcing equipment (PSE) device comprising:
   a network port configurable to couple to an Ethernet network cable;
   a power field effect transistor (FET) including a first terminal coupled to the network port, a control terminal, and a second terminal coupled to a power supply node; and
   control circuitry coupled to the control terminal and configured to determine a total energy dissipated in the power FET during a power-on phase of a device coupled to the network port and to detect an error when the total energy exceeds a threshold.

9. The PSE device of claim 8, wherein the control circuitry comprises:
   a measurement circuit coupled to the power FET;
   a micro control unit (MCU) configured to receive one or more signals from the measurement circuit; and
   drive circuitry coupled to the power FET and responsive to control signals from the MCU to control operation of the power FET.

10. The PSE device of claim 8, wherein the control circuitry comprises:
    a controller configured to monitor a voltage across the power FET and a current flowing through the power FET and including an output terminal; and
    a gate driver circuit coupled to the output terminal and to the control terminal of the power FET, the gate driver circuit responsive to a control signal from the controller to control the power FET.

11. The PSE device of claim 8, wherein the control circuitry is configured to turn off the power FET in response to detecting the error.

12. The PSE device of claim 8, wherein the control circuitry is configured to capture current measurements of current flowing through the power FET and voltage measurements corresponding to a voltage across the power FET, periodically, and to determine the total energy based on the current measurements and the voltage measurements.

13. The PSE device of claim 8, wherein the control circuitry comprises:
    a processor; and
    a memory accessible to the processor and configured to store the threshold and to store instructions that, when executed, cause the processor to determine the total energy provided to the power FET, to compare the total energy to the threshold, and to detect an error when the total energy exceeds the threshold.

14. The PSE device of claim 13, wherein the memory further includes instructions that, when executed, cause the processor to monitor a port voltage of the network port and to detect an error when a rate of change of the port voltage differs from a threshold voltage signature during the power-on phase.

15. The PSE device of claim 8, wherein the threshold comprises an energy value of approximately 0.3 Joules.

16. A circuit for use within a power sourcing equipment (PSE) device, the circuit comprising:
    a first terminal configured to couple to a control terminal of a power field effect transistor (FET) coupled to an Ethernet network port of the PSE device; and
    a control circuit coupled to the first terminal and configured to detect an error when a total energy provided to the power FET exceeds a threshold during a power on phase of a device coupled to the Ethernet network port.

17. The circuit of claim 16, wherein the control circuit is coupled to the Ethernet network port and further configured to detect the error when a port voltage has a rate of change that differs from a pre-determined rate of change.

18. The circuit of claim 17, wherein the pre-determined rate of change is approximately 2.36 Volts per millisecond.

19. The circuit of claim 16, wherein the threshold comprises an energy value of approximately 0.3 Joules.

20. The circuit of claim 15, further comprising a second terminal coupled to a first terminal of the power FET and a third terminal coupled to a second terminal of the power FET.

* * * * *